United States Patent
Yu

(10) Patent No.: US 10,713,879 B2
(45) Date of Patent: Jul. 14, 2020

(54) COOKING DEVICE FOR A FOOD VENDING MACHINE

(71) Applicant: Pen Chun Yu, Hualien (TW)

(72) Inventor: Pen Chun Yu, Hualien (TW)

( * ) Notice: Subject to any disclaimer, the term of this patent is extended or adjusted under 35 U.S.C. 154(b) by 357 days.

(21) Appl. No.: 15/783,149

(22) Filed: Oct. 13, 2017

(65) Prior Publication Data
US 2019/0114868 A1    Apr. 18, 2019

(51) Int. Cl.
*A47J 37/04* (2006.01)
*G07F 17/00* (2006.01)
*A47J 37/12* (2006.01)

(52) U.S. Cl.
CPC ........ *G07F 17/0078* (2013.01); *A47J 37/045* (2013.01); *A47J 37/1214* (2013.01)

(58) Field of Classification Search
CPC ..... A47J 37/044; A47J 37/045; A47J 37/1214
USPC .................................. 99/357, 404
See application file for complete search history.

(56) References Cited

U.S. PATENT DOCUMENTS

| | | | | |
|---|---|---|---|---|
| 2,244,670 A | * | 6/1941 | Benedict | A47J 37/044 99/339 |
| 4,103,606 A | * | 8/1978 | Gitcho | A47J 37/045 126/25 R |
| 4,944,218 A | * | 7/1990 | Cresson | G07F 9/105 99/357 |
| 5,590,588 A | * | 1/1997 | Tomimatsu | G07F 9/105 222/272 |
| 2006/0191918 A1 | * | 8/2006 | Ashford | G07F 9/105 219/728 |
| 2012/0070553 A1 | * | 3/2012 | Hockett | A47J 37/1214 426/438 |
| 2013/0122158 A1 | * | 5/2013 | Hessel | A21B 1/48 426/233 |
| 2018/0140124 A1 | * | 5/2018 | Heinze | B65G 17/063 |

FOREIGN PATENT DOCUMENTS

| | | | | |
|---|---|---|---|---|
| DE | 129281-6 A1 | * | 3/1960 | ............ A47J 37/045 |
| WO | WO-2012137228 A1 | * | 10/2012 | ............ A47J 37/045 |

* cited by examiner

*Primary Examiner* — Reginald Alexander
(74) *Attorney, Agent, or Firm* — Muncy, Geissler, Olds & Lowe, P.C.

(57) ABSTRACT

A cooking device equipped in a food vending machine for cooking ingredients provided by the food vending machine has a chamber, a heating component, and a moving mechanism. The chamber extends in a straight line. The heating component and the moving mechanism are mounted in the chamber. The moving mechanism is used for moving the ingredients from the entrance to the exit. Thus, the cooking device can heat the raw ingredients until fully cooked, so the food vending machine can provide fresh and cooked-on-the-spot food. Furthermore, space in the chamber is utilized efficiently and the chamber suits for various ingredients and cooking methods. Besides, the moving mechanism is capable of moving multiple containers which contain ingredients, so the cooking device can heat multiple sets of ingredients at the same time.

15 Claims, 12 Drawing Sheets

COOKING DEVICE FOR A FOOD VENDING MACHINE

BACKGROUND OF THE INVENTION

1. Field of the Invention

The present invention relates to device for cooking ingredients in a food vending machine.

2. Description of the Prior Arts

A common type of vending machine is beverage vending machine. The advantages of the beverage vending machine are that a site for setting up the beverage vending machine is not constrained and a space occupied by the vending machine is small. Thus, for beverage suppliers, selling products through vending machines is very economic because operating costs are low but profits are high. On the other hand, when consumers feel thirsty, they can buy beverages from the beverage vending machines immediately and conveniently. However, when the consumers are hungry and want to get foods immediately and conveniently, except for eating bread or instant noodles, they can only buy frozen foods in convenience stores and heat the frozen foods with a microwave oven. Bread and frozen foods do not provide adequate nutrition; furthermore, frozen foods sold by the convenience stores are pre-cooked and reheated to a suitable temperate before serving, and thus not only the tastes and flavors of the frozen foods are changed, but also nutrition of the frozen foods is lost.

To overcome the shortcomings, the present invention provides a cooking device for a food vending machine to mitigate or obviate the aforementioned problems.

SUMMARY OF THE INVENTION

The main objective of the present invention is to provide a cooking device for a food vending machine that can cook ingredients in the food vending machine.

The cooking device is equipped in the food vending machine for cooking ingredients provided by the food vending machine, and the cooking device comprises a chamber, a heating component, and a moving mechanism. The chamber is extending in a straight line and has an entrance, an exit, a preparing space, an entrance cover, and an exit cover. The entrance and the exit are located on two ends of the chamber. The preparing space is located between the entrance and the exit and communicates with the entrance and the exit. The entrance cover selectively closes the entrance. The exit cover selectively closes the exit. The heating component is mounted in the preparing space of the chamber and extends in a lengthwise direction of the chamber. The moving mechanism is mounted in the preparing space of the chamber and extends in the lengthwise direction of the chamber. The moving mechanism is capable of transiting the ingredients from the entrance to the exit of the chamber.

The cooking device of the present invention may be equipped in a food vending machine and cook the raw ingredients provided by the food vending machine and then package the cooked food, so that the food vending machine is capable of providing fresh and cooked-on-the-spot food. With the straight chamber and the entrance and the exit arranged on two ends of the chamber, the straight chamber has a better efficiency of utilizing space in the food vending machine compared to that of another shape (e.g. a circle), so that the ingredients may be heated during delivery from the entrance to the exit. In other words, the ingredients are moved through the whole space in the chamber, and the space in the chamber is fully utilized. Therefore, the straight chamber suits for the food vending machine which has a limited space inside. In addition, through controlling the durations of the ingredients staying in the chamber by the moving mechanism, the cooking device may suit for different ingredients and cooking methods, so the food vending machine can provide various meals. Besides, the moving mechanism can move multiple containers containing the ingredients, so that the ingredients in the multiple containers may be heated at the same time, which reduces waiting time of consumers.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
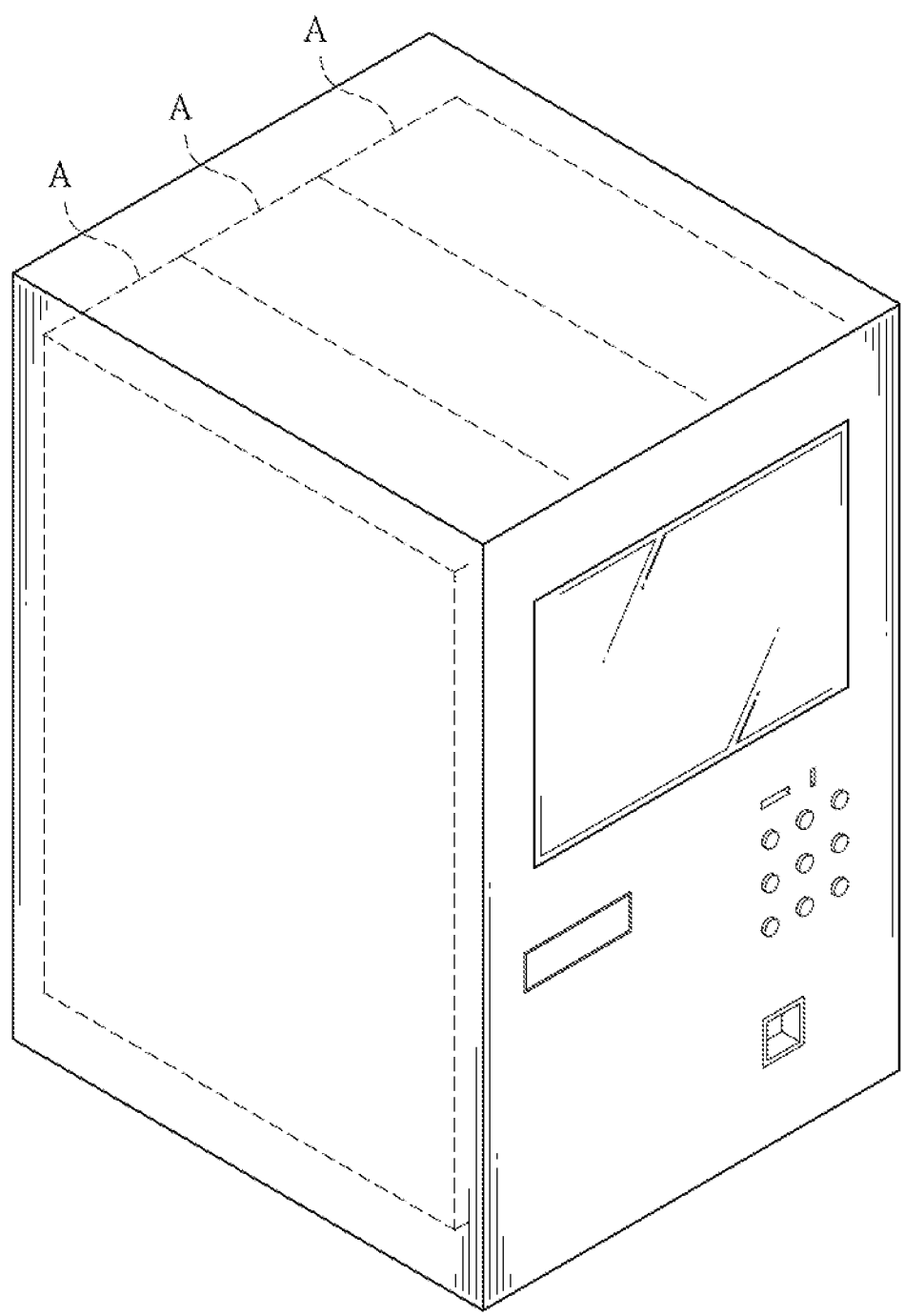
FIG. 1 is a schematic view of a food vending machine and a food-preparing device.
Figure 2:
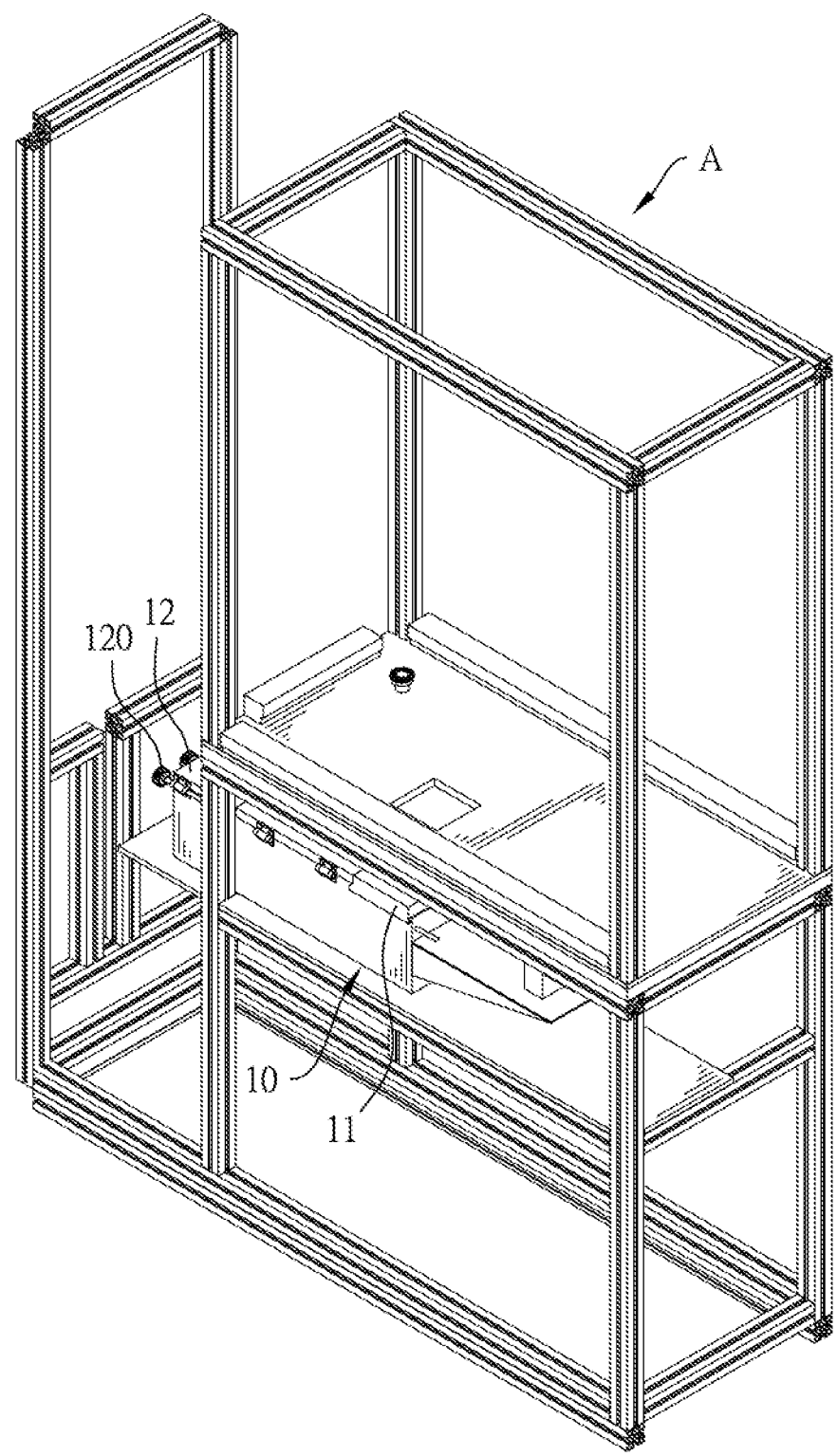
FIG. 2 is a schematic view of a cooking device in accordance with the present invention equipped on the food-preparing device in FIG. 1.

With reference to FIGS. 1 to 3 and FIG. 10, a cooking device according to the present invention for a food vending machine is provided. The cooking device is equipped in a food-preparing device A of the food vending machine and cooks ingredients and packs and dispenses the cooked food for sale from the food vending machine. The ingredients in the food vending machine are raw, but the meals are cooked by the cooking device of the present invention. In this embodiment, the ingredients are rationed in a container B by the same amount, and thereby the food-preparing device A provides the same amount of ingredients along with the container B to the cooking device. The cooking device comprises a straight chamber 10, a heating component 20, a moving mechanism 30, a driving mechanism 40, and an elevating mechanism 50.

Figure 3:
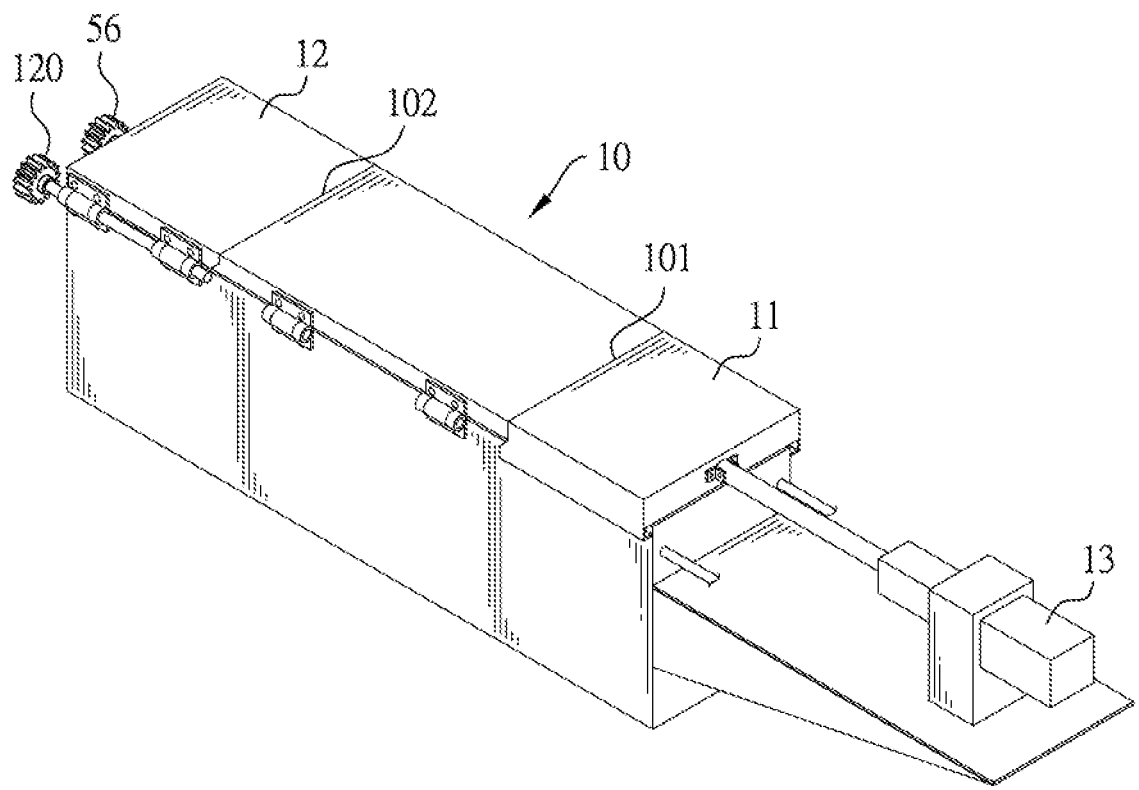
FIG. 3 is a schematic view of the cooking device in FIG. 2.
Figure 10:
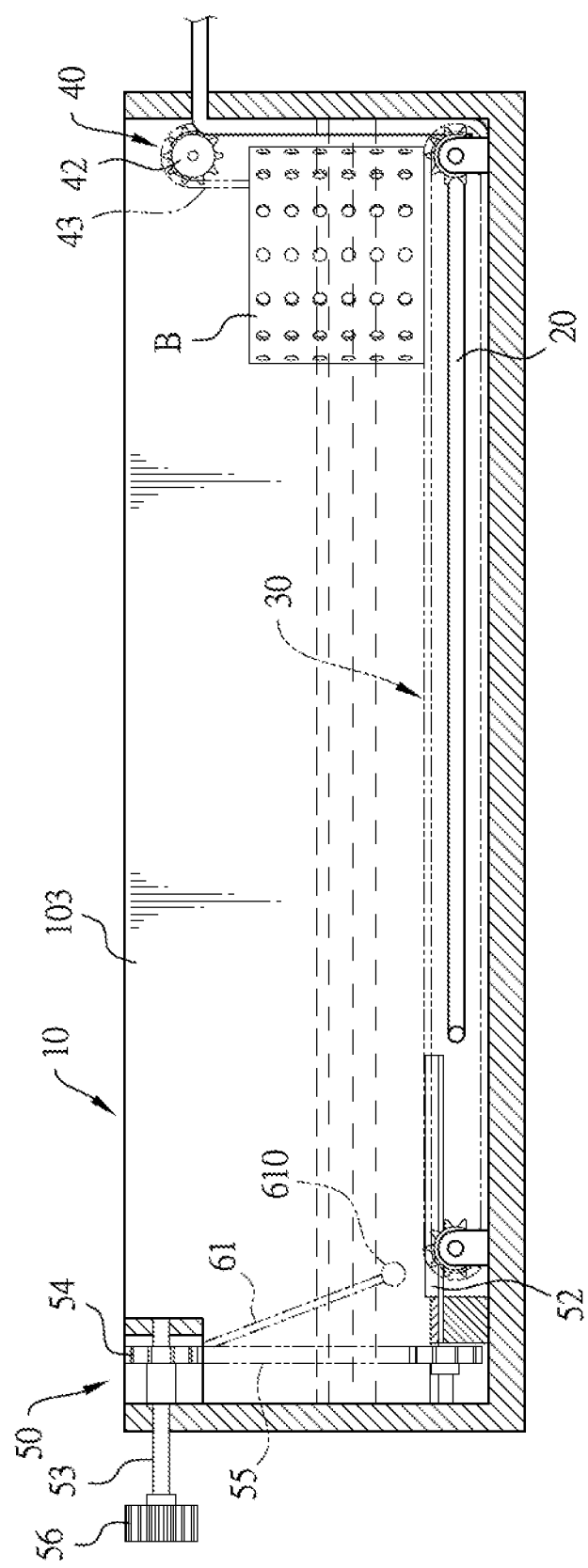
FIGS. 10 to 12 are operational schematic views.

Then please refer to FIG. 3 and FIG. 10. The chamber 10 extends in a straight line and has an entrance 101, an exit 102, and a preparing space 103. The entrance 101 and the exit 102 are located on two ends of an upper surface of the chamber 10, and the preparing space 103 is located between the entrance 101 and the exit 102 and communicates with the entrance 101 and the exit 102. Therefore, the preparing space 103 may contain water, soup, or fired oil for steaming, braising, or firing the ingredients when the ingredients pass through the preparing space 103. Alternatively, the preparing space 103 may not contain water, soup, or fired oil, and thus the ingredients can be roasted when passing through the preparing space 103. In another embodiment, if the chamber 10 is for roasting, the entrance 101 and the exit 102 may be arranged at end surfaces of the chamber 10 respectively.

Figure 4:
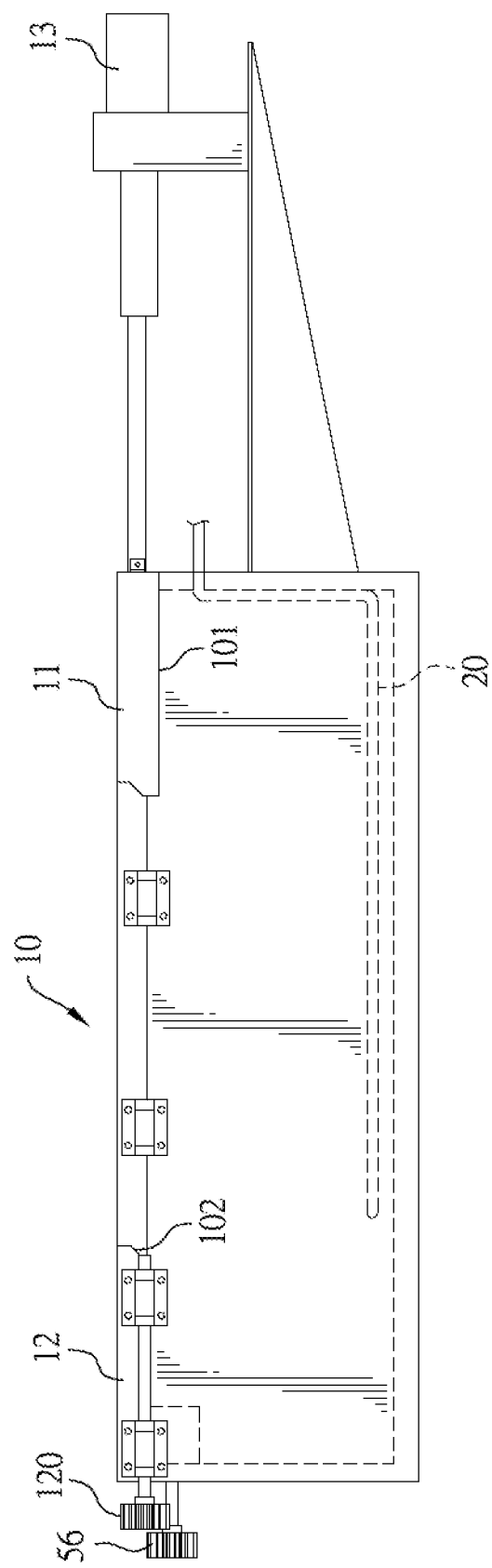
FIG. 4 is a side view of the cooking device in FIG. 3.
Figure 5:
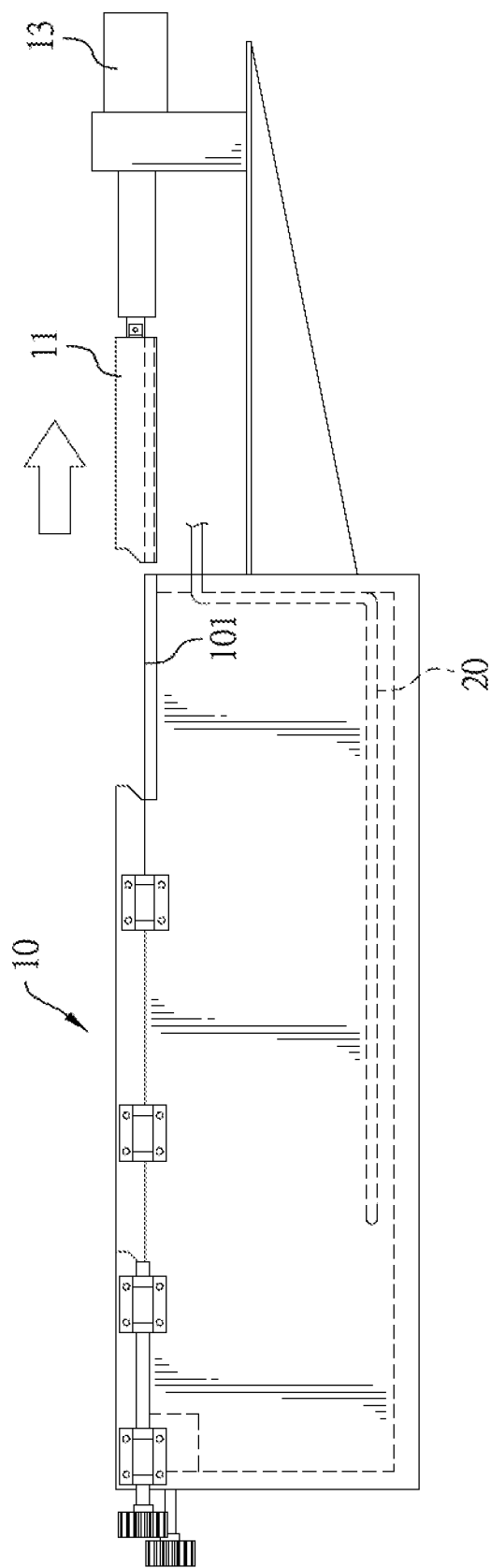
FIG. 5 is a side view of the cooking device in FIG. 3, shown with an entrance cover being opened.

The please also refer to FIGS. 4 and 5. The chamber 10 comprises an entrance cover 11 and an exit cover 12. The entrance cover 11 selectively closes the entrance 101 and the exit cover 12 selectively closes the exit 102 since the entrance cover 11 and the exit cover 12 also are mounted on the two ends of the upper surface of the chamber 10. In this embodiment, the chamber 10 further comprises a hydraulic cylinder 13. The hydraulic cylinder 13 is connected to the entrance cover 11 and drives the entrance cover 11 to move in a lengthwise direction of the chamber 10.

Figure 6:
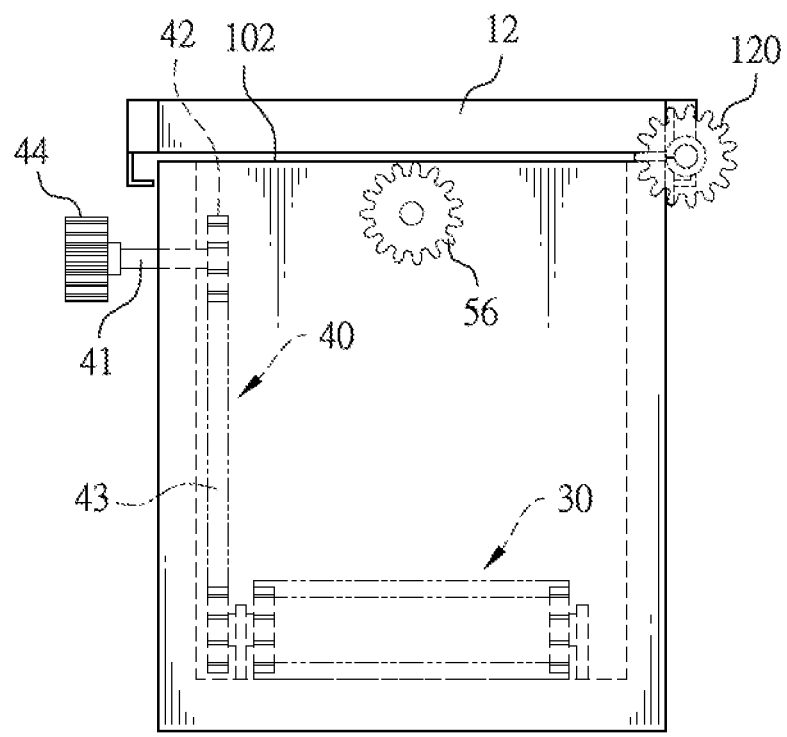
FIG. 6 is another side view of the cooking device in FIG. 3.
Figure 7:
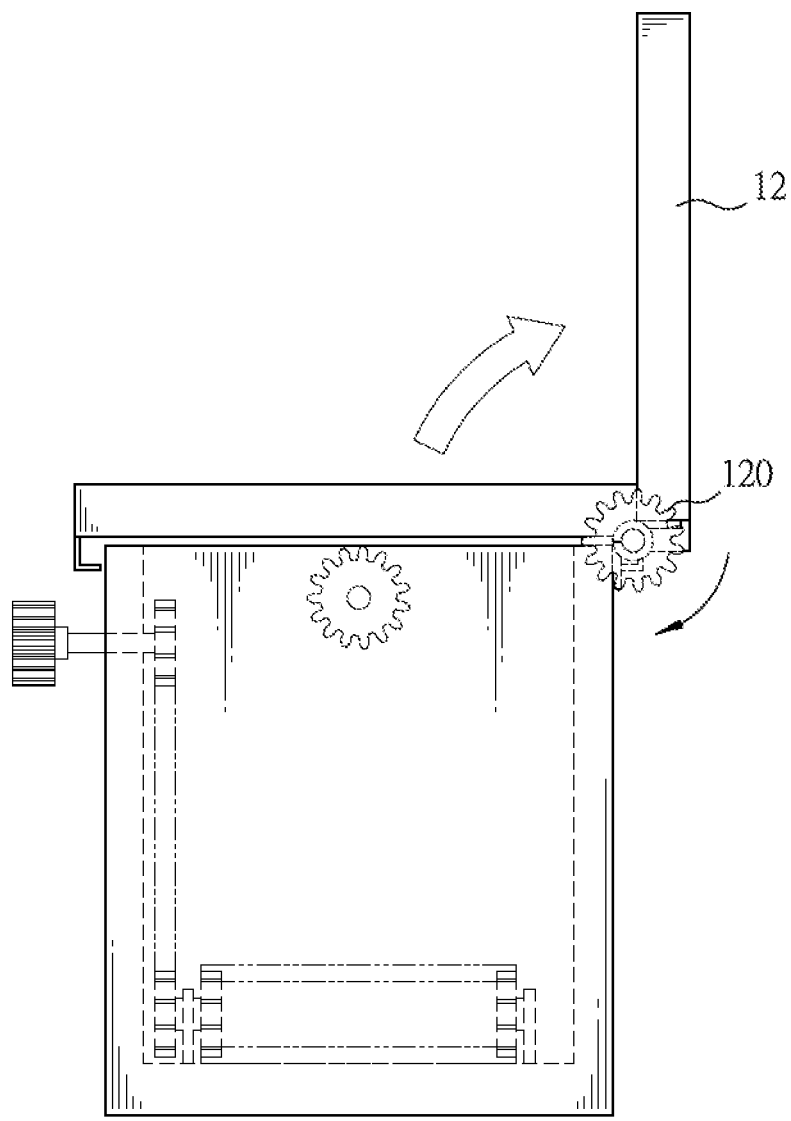
FIG. 7 is a side view of the cooking device in FIG. 3, shown with an exit cover being opened.

The please also refer to FIGS. 6 and 7. The exit cover 12 is pivotably mounted on the chamber 10 and tilts about a lengthwise side of the chamber 10. In other words, a pivoting shaft of the exit cover 12 is on the lengthwise side of the chamber 10. In this embodiment, the exit cover 12 comprises a joint gear which is a first joint gear 120. The first joint gear 120 is mounted on an end of the pivoting shaft of the exit cover 12 and on the end surface of the chamber 10. Therefore, the first joint gear 120 is detachably connected to a power source (not shown in the drawings) of the food vending machine for driving the exit cover 12 to pivot.

Figure 9:
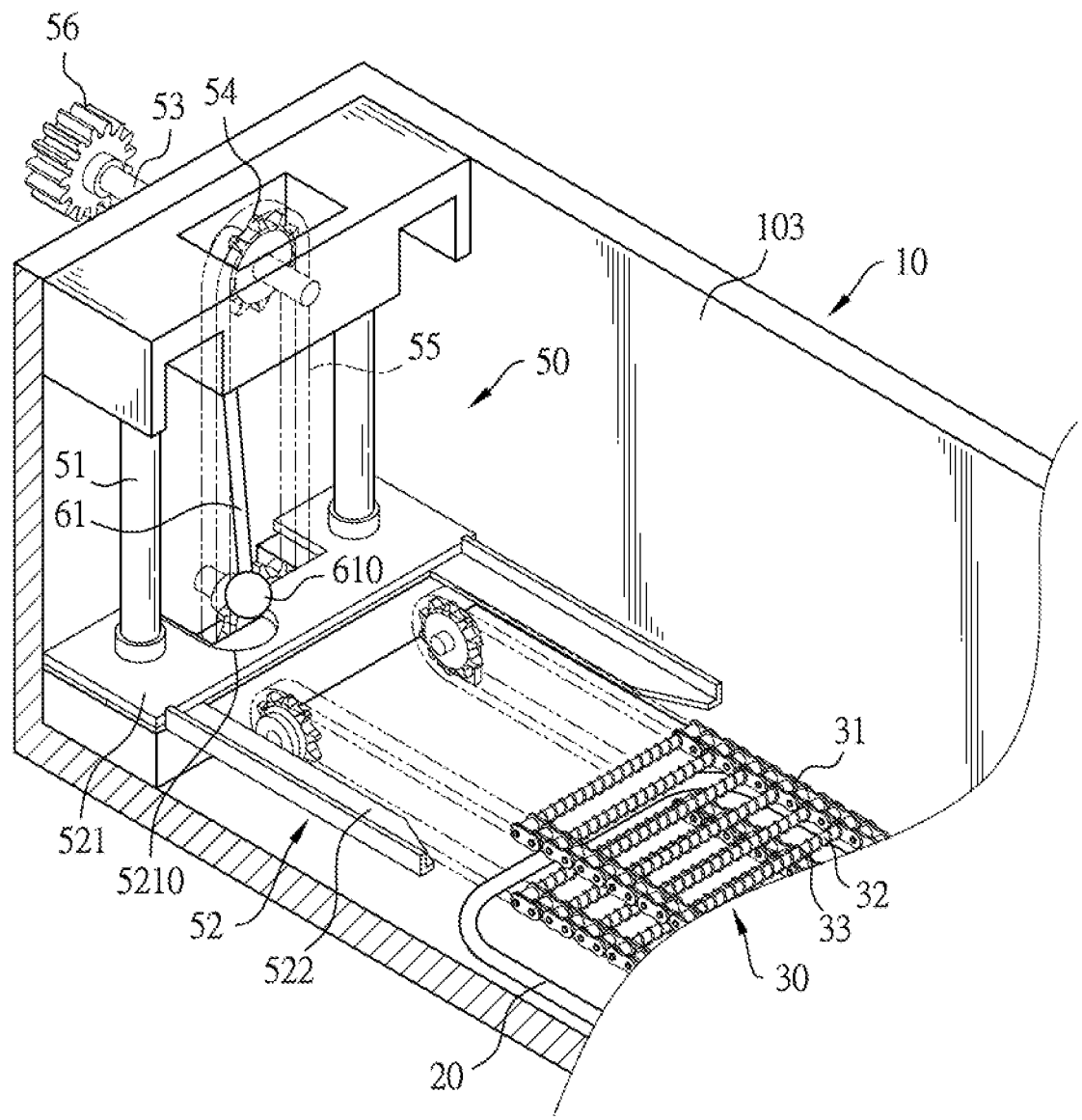
FIG. 9 is schematic view of an elevating mechanism of the cooking device in FIG. 3.

The please refer to FIGS. 4 and 9. The heating component 20 is mounted in the preparing space 103 of the chamber 10 and extends in the lengthwise direction of the chamber 10. In this embodiment, the heating component 20 may be, but not limited to, an electric heating element. The heating component 20 may be a microwave generator or a gas stove.

Figure 8:
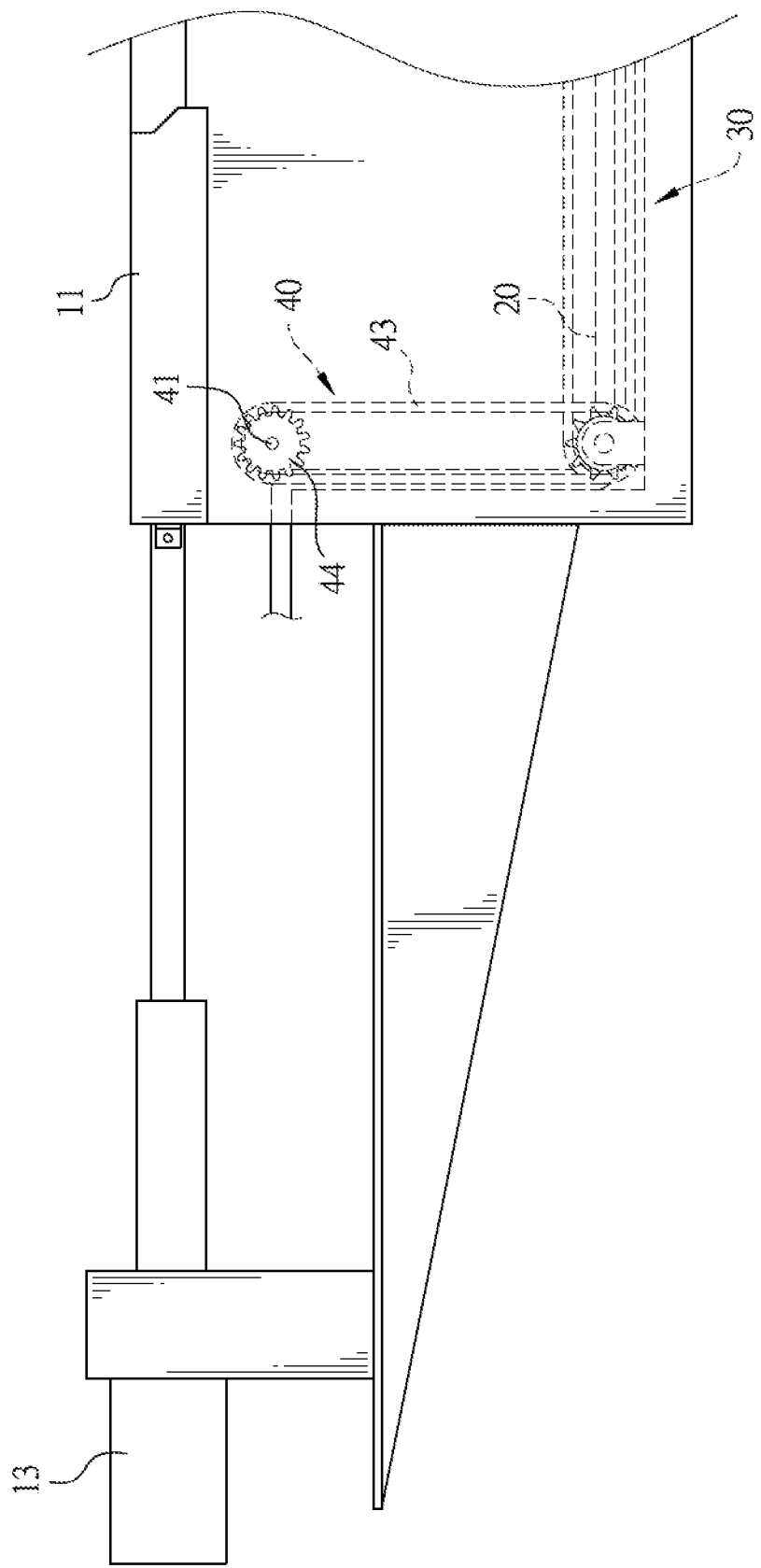
FIG. 8 is another side view of a moving mechanism and a driving mechanism of the cooking device in FIG. 3.

The please refer to FIGS. 3, 8, and 9. The moving mechanism 30 is mounted in the preparing space 103 of the chamber 10 and extends in the lengthwise direction of the chamber 10, and thereby the ingredients put into the preparing space 103 may be transited from the entrance 101 to the exit 102. The moving mechanism 30 may be a conveyor belt. The conveyor belt comprises two chains 31, a plurality of connecting rods 32, and a plurality of spiral components 33. The two chains 31 are parallel and separate from each other and are arranged in a loop. The connecting rods 32 connect the two chains 31. Each one of the spiral components 33 is sleeved on a respective one of the connecting rods 32 for increasing frictions of the conveyor belt, so that the containers B containing the ingredients are capable of being moved on the conveyor belt. Each one of the spiral components 33 may be a spiral rod and a sleeve with at least one spiral protrusion.

The please refer to FIGS. 6 and 8. The driving mechanism 40 is connected to the power of the food vending machine so that the moving mechanism 30 can be driven. The driving mechanism 40 comprises a first driving rod 41, a first driving element 42, a first driving belt 43, and a joint gear.

The first driving rod 41 is mounted through a side surface of the chamber 10, and, in this embodiment, the first driving rod 41 is adjacent to the upper surface of the chamber 10. In other words, one end of the first driving rod 41 is located in the chamber 10, and another end of the chamber 10 is located out of the chamber 10. The first driving element 42 is securely mounted on one end of the first driving rod 41, and said end of the first driving rod 41 is the end that is located in the chamber 10. The first driving belt 43 is disposed in the chamber 10 and arranged in a loop. One end of the first driving belt 43 is sleeved on the first driving element 42 in the chamber 10, and another end of the first driving belt 43 is connected to the moving mechanism 30. In this embodiment, the first driving element 42 is a sprocket and the first driving belt 43 is a chain, and the first driving element 42 engages the first driving belt 43. In another embodiment, the first driving element 42 may be an active pulley, and the first driving belt 43 may be a belt. The joint gear of the driving mechanism 40 is a second joint gear 44 securely mounted on one end of the first driving rod 41, and said end of the first driving rod 41 is the end that is located out of the chamber 10. Thus, the second joint gear 44 is detachably connected to the power source of the food vending machine, so that the moving mechanism 30 can be driven by the driving mechanism 40.

Then please refer to FIGS. 9 and 10. The elevating mechanism 50 is mounted in the preparing space 103 and is adjacent to the exit 102. The elevating mechanism 50 comprises at least one guiding track 51, an elevating board 52, a second driving rod 53, a second driving element 54, a second driving belt 55, and a joint gear.

The at least one guiding track 51 extends in a height direction of the chamber 10. In this embodiment, a number of the at least one guiding track 51 is two. The two guiding tracks 51 are parallel and separate from each other, and are arranged in the preparing space 103 and adjacent to one of the end surfaces of the chamber 10. In this embodiment, each one of the guiding tracks 51 is a rod.

The elevating board 52 is capable of moving along the at least one guiding track 51. In other words, the elevating board 52 can be moved in the height direction of the chamber 10. The elevating board 52 comprises a connecting part 521 and two arms 522. Two ends of the connecting part 521 are connected to the two guiding tracks 51 respectively, and, in this embodiment, the two ends of the connecting part 521 are sleeved on the two guiding tracks 51. The connecting part 521 forms a cavity 5210.

The two arms 522 are parallel and separate from each other. The two arms 522 extend in the lengthwise direction of the chamber 10. Each arm 522 has a fixed end and a lifting end. The fixed end of each one of the two arms 522 is securely mounted on the two ends of the connecting part 521 respectively, and the lifting ends of the two arms 522 are disposed on two sides of the moving mechanism 30 respectively. In other words, a distance between the two arms 522 is larger than a width of the moving mechanism 30. However, the distance between the two arms 522 is smaller than a width of the container B, which ensures that the arms can elevate the container B during operation.

When the elevating board 52 moves to a lower end of its stroke, the lifting ends of the two arms 522 are on two sides of the moving mechanism 30 but lower than an upper surface of the conveyor belt of the moving mechanism 30. When the elevating board 52 moves to the upper end of the stroke, the two arms 522 are adjacent to the exit 102 of the chamber 10.

The second driving rod 53 is mounted through one side surface of the chamber 10 and adjacent to the exit 102 and said side surface may not be the same surface through which the first driving rod 41 is mounted. In this embodiment, said side surface mounted through by the second driving rod 53 is one of the end surfaces of the chamber 10. One end of the second driving rod 53 is located in the chamber 10, and another end of the second driving rod 53 is located out of the chamber 10. The second driving element 54 is securely mounted on one of the ends of the second driving rod 53, and said end is located in the chamber 10. The second driving belt 55 is disposed in the chamber 10 and is arranged in a loop. One end of the second driving belt 55 is sleeved on the second driving element 54, which is located in the chamber 10. Another end of the second driving belt 55 is connected to the elevating board 52 and thereby the elevating board 52 is driven to move up and down. In this embodiment, the second driving element 54 is a sprocket and the second driving belt 55 is a chain, and the second driving element 54 engages the second driving belt 55.

The joint gear of the elevating mechanism 50 is a third joint gear 56 securely mounted on the other end of second driving rod 53, and said the other end is located out of the chamber 10. Therefore, the third joint gear 56 is detachably connected to the power source of the food vending machine, so that the elevating board 52 of the elevating mechanism 50 is driven.

The cooking device of the present invention further comprises a sensor for detecting a location of the food ingredients. In this embodiment, the sensor comprises a tilting component 61. The tilting component 61 changes a tilting angle in the lengthwise direction of the chamber 10 when abutted by the ingredients. Precisely, one end of the tilting component 61 is tiltably mounted adjacent to the exit 102, and another end of the tilting component 61 comprises a block 610. In this embodiment, the tilting component 61 is accommodated in the cavity 5210 of the elevating board 52.

Figure 11:
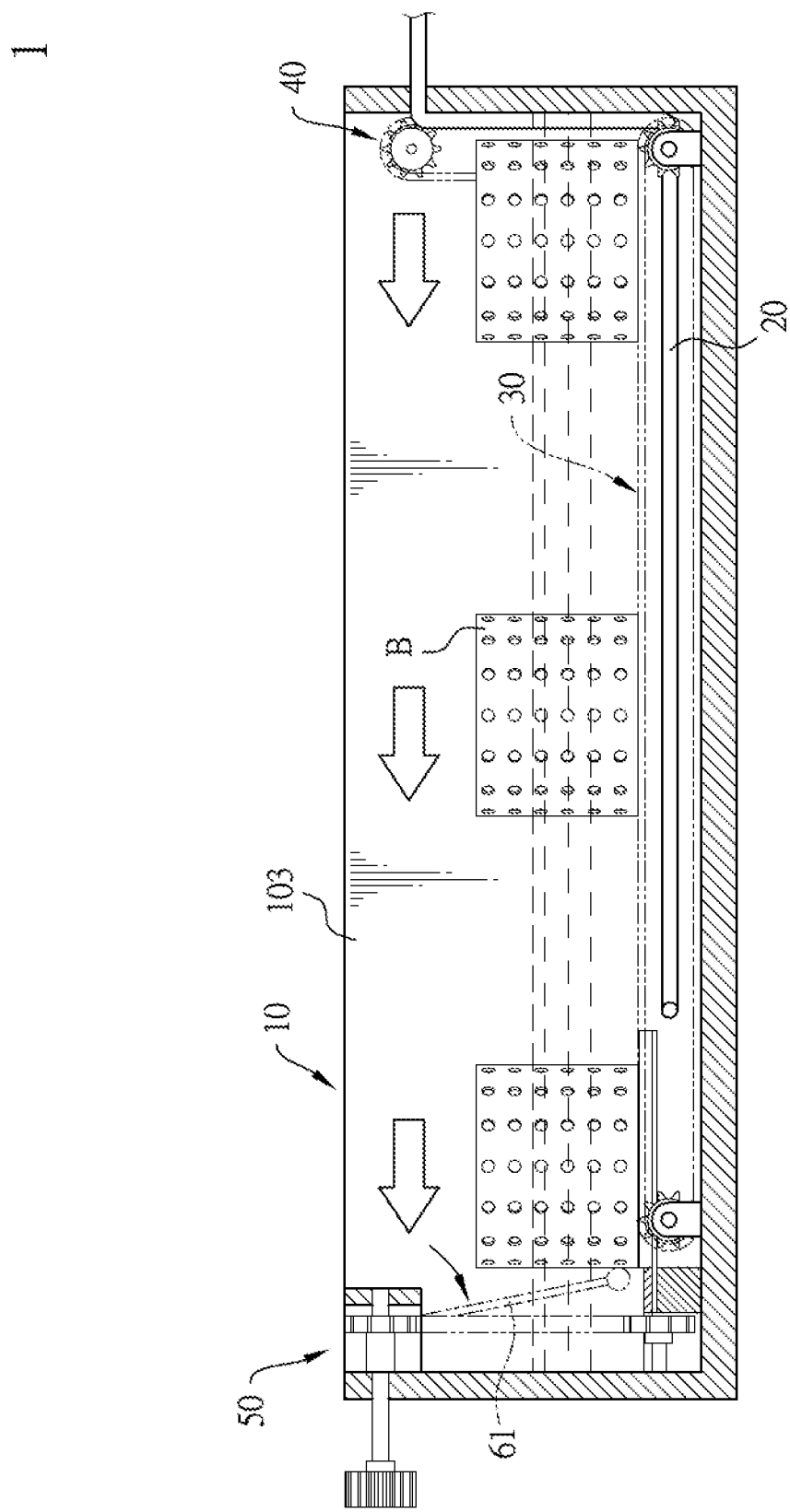
Figure 12:
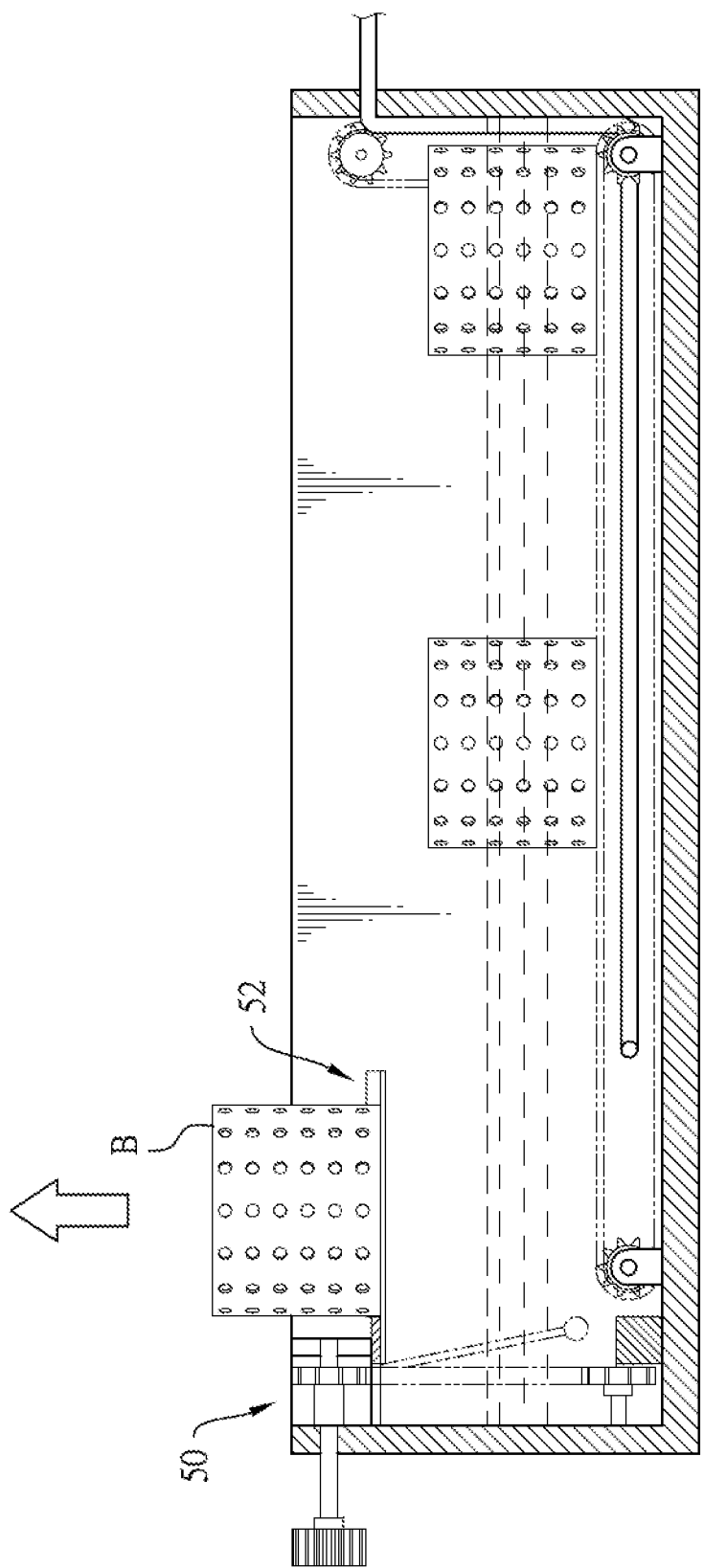

When the present invention is in use, the food vending machine provides ingredients contained in the container B. Meanwhile, as shown in FIGS. 4, 5, and 10, the entrance cover 11 of the chamber 10 is driven by the hydraulic cylinder 13 to move horizontally, which causes the entrance 101 to be opened and the container B can move into the preparing space 103 through the entrance 101 and on the moving mechanism 30. Then, as shown in FIGS. 10 and 11, the power source of the food vending machine drives the moving mechanism 30 via the driving mechanism 40, the container B is driven by the moving mechanism 30 and moves from the entrance 101 to the exit 102 of the chamber 10, and the heating component 20 keeps heating the container B during the movement. Thus, when the container B moves adjacent to the exit 102, the ingredients in the container B are fully cooked.

In the cooking device of the present invention, with the moving mechanism 30 driving the container B at different speeds, a heated duration of the ingredients may be controlled. Thus, the cooking device suits for variable ingredients and variable cooking methods, e.g. microwaving, pan-frying, braising, steaming, firing, and roasting.

For example, for braising, the chamber 10 should contain water or soup, and a liquid level of the water or the soup is higher than a half of the chamber 10, the heating component 20, and moving mechanism 30. After the heating component 20 heats the water or the soup, the ingredients immersed in the water or the soup are braised when moved by the moving mechanism 30. In this embodiment, the heating component 20 may extend on a bottom surface of the chamber 10.

For steaming, the chamber 10 should contain water, but a liquid level of the water may not be higher than the moving mechanism 30. After the water is heated by the heating component 20 and becomes steams, the ingredients moved by the moving mechanism 30 may be immersed in the steams and heated. In this embodiment, the heating component 20 may also extend on the bottom surface of the chamber 10.

For firing, the chamber 10 should contain firing oil, and a liquid level of the firing oil is higher than the half of the chamber 10, the heating component 20, and moving mechanism 30. After the heating component 20 heats the firing oil, the ingredients immersed in the firing oil are fried while being moved by the moving mechanism 30. In this embodiment, the heating component 20 may extend on the bottom surface of the chamber 10.

For roasting, the chamber 10 should not contain water, soup, or oil, but the heating component 20 heats the ingredients directly through heat radiation. In this embodiment, the heating component 20 may not only extend on the bottom surface of the chamber 10, but also extend on two side surfaces of the chamber 10.

In addition, when many consumers purchase food of the food vending machine, the multiple containers B may be put into the cooking device of the present invention one by one, so ingredients in the multiple containers B are heated at the same time and thereby waiting time of the consumers is reduced.

As shown in FIGS. 6, 7, 11, and 12, when the sensor detects that one of the containers B is moved under the exit 102, the elevating mechanism 50 and the exit cover 12 are activated, and the moving mechanism 30 stops to move the containers B temporally. In this embodiment, when the container B is moved to a position near the exit 102 and pushes the tilting component 61 and a tilting angle of the tilting component 61 is changed to greater than a predetermined angle, the elevating mechanism 50 and the exit cover 12 are activated to operate. When the container B is moved under the exit 102, the container B is also located over the elevating board 52 of the elevating mechanism 50. Therefore, after the exit cover 12 is opened and the elevating board 52 lifts the container B, the container B can be moved out of the exit 102.

After that, the container B may be picked up by a clamp or a robotic arm of the food vending machine, and then the cooked ingredients are packaged or further processed. In another embodiment, the cooking device may not comprise the elevating mechanism 50, but the container B is picked up by a clamp or a robotic arm of the food vending machine extending into the chamber 10 instead when the container B is moved under the exit 102. After the container B is picked up, the exit cover 12 closes again, the elevating board 52 moves to the lower end of the stroke, and then the moving mechanism 30 moves the remaining containers B.

As shown in FIGS. 2, 3, 6, and 9, to be clean and hygienic, the cooking device of the present invention is detachable from the food vending machine. Precisely, the chamber 10 comprises pulleys so as to be detached easily. Besides, with the first joint gear 120 of the exit cover 12, the second joint gear 44 of the driving mechanism 40, and the third joint gear 56 of the elevating mechanism 50 being detachably connected to the power source of the food vending machine, the cooking device is driven by the external power, which makes the cooking device light in weight and easy to move.

On the other hand, as shown in FIGS. 6, 9, and 10, each component in the chamber 10 is made of food-grade stainless steel, so the components in the chamber 10 may not be rusted and become filthy. Besides, with the first driving rod 41 of the driving mechanism 40 is mounted through the chamber 10 and near the upper surface of the chamber 10 and the second driving rod 53 of the elevating mechanism 50 is mounted through the exit 102 of the chamber 10 (i.e. near an upper edge of the end surface), the water, the soup, or the firing oil in the chamber 10 may not be leaked from a position where the first driving rod 41 or the second driving rod 53 is mounted.

Consequently, the cooking device of the present invention may be equipped in a food vending machine and cook the raw ingredients provided by the food vending machine and then pack the cooked food, so that the food vending machine is capable of providing fresh and cooked-on-the-spot food. With the chamber 10 extending in a straight line and the entrance 101 and the exit 102 arranged on two ends of the chamber 10, the straight chamber 10 has a better efficiency of utilizing space in the food vending machine compared to that of another shape (e.g. a circle), so that the ingredients may be heated during movement from the entrance 101 to the exit 102. In other words, the ingredients are moved through the whole space in the chamber 10, so there is no wasted space in the chamber 10. Therefore, the chamber 10 extending in a straight line suits for the food vending machine which has limited space therein. In addition, by controlling the durations of the ingredients staying in the chamber 10 by the moving mechanism 30, the cooking device may suit for different ingredients and cooking methods, so the food vending machine can provide various foods or meals. Besides, the moving mechanism 30 can move multiple containers B containing the ingredients, so that the ingredients in the multiple containers B may be heated at the same time, which reduces waiting time of consumers.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cooking device equipped in a food vending machine for cooking ingredients provided by the food vending machine, the cooking device comprising:
    a chamber extending in a straight line and having:
        an entrance and an exit located on two ends of the chamber;
        a preparing space located between the entrance and the exit and communicating with the entrance and the exit;
        an entrance cover selectively closing the entrance; and
        an exit cover selectively closing the exit;
    a heating component mounted in the preparing space of the chamber and extending in a lengthwise direction of the chamber; and
    a moving mechanism mounted in the preparing space of the chamber and extending in the lengthwise direction of the chamber, the moving mechanism capable of transiting the ingredients from the entrance to the exit of the chamber;
    wherein the moving mechanism is a conveyor belt, the conveyor belt comprising:
        two chains being parallel and separate from each other, and each of the two chains arranged in a loop;
        a plurality of connecting rods, each one of the connecting rods connecting the two chains; and
        a plurality of spiral components sleeved on the connecting rods.

2. The cooking device as claimed in claim 1 further comprising:
    a driving mechanism comprising:
        a first driving rod mounted through a side wall of the chamber, one end of the first driving rod located in the chamber and another end of the first driving rod located out of the chamber;
        a first driving element securely mounted at the end of the first driving rod that is located in the chamber; and
        a first driving belt arranged in a loop, one end of the first driving belt sleeved on the first driving element, and another end of the first driving belt connected to the moving mechanism.

3. The cooking device as claimed in claim 2, wherein the driving mechanism further comprises:
    a joint gear securely mounted on the end of the first driving rod that is located out of the chamber and said joint gear detachably connected to a power source of the food vending machine.

4. The cooking device as claimed in claim 1 further comprising:
    an elevating mechanism mounted in the preparing space and adjacent to the exit, the elevating mechanism being capable of elevating the ingredients from the moving mechanism to the exit.

5. The cooking device as claimed in claim 3 further comprising:
    an elevating mechanism mounted in the preparing space and adjacent to the exit, the elevating mechanism being capable of elevating the ingredients from the moving mechanism to the exit.

6. The cooking device as claimed in claim 5, wherein the elevating mechanism comprises:
    at least one guiding track extending in a height direction of the chamber;
    a second driving rod mounted through a side wall of the chamber and adjacent to the exit, one end of the second driving rod located in the chamber and another end of the second driving rod located out of the chamber;
    a second driving element securely mounted on the end of the second driving rod that is located in the chamber;
    a second driving belt arranged in a loop and sleeved on the second driving element; and
    an elevating board connected to the second driving belt and capable of moving along the at least one guiding track.

7. The cooking device as claimed in claim 1 further comprising:
    a sensor for detecting a location of the ingredients, the sensor mounted in the preparing space and adjacent to the exit and activating the exit cover to open.

8. The cooking device as claimed in claim 6 further comprising:
    a sensor for detecting a location of the ingredients, the sensor mounted in the preparing space and adjacent to the exit and activating the exit cover to open.

9. The cooking device as claimed in claim 8, wherein the sensor comprises:
    a tilting component; one end of the tilting component tiltably mounted adjacent to the exit, and the tilting component capable of tilting along the lengthwise direction of the chamber when abutted by the ingredients; the tilting component comprising:
    a block located at another end of the tilting component opposite the exit.

10. The cooking device as claimed in claim 9, wherein the exit cover is pivotably mounted on the chamber and comprises:
    a joint gear, the joint gear of the entrance cover detachably connected to the power source of the food vending machine.

11. A cooking device equipped in a food vending machine for cooking ingredients provided by the food vending machine, the cooking device comprising:
- a chamber extending in a straight line and having:
  - an entrance and an exit located on two ends of the chamber;
  - a preparing space located between the entrance and the exit and communicating with the entrance and the exit;
  - an entrance cover selectively closing the entrance; and
  - an exit cover selectively closing the exit;
- a heating component mounted in the preparing space of the chamber and extending in a lengthwise direction of the chamber;
- a moving mechanism mounted in the preparing space of the chamber and extending in the lengthwise direction of the chamber, the moving mechanism capable of transiting the ingredients from the entrance to the exit of the chamber; and
- an elevating mechanism mounted in the preparing space and adjacent to the exit, the elevating mechanism being capable of elevating the ingredients from the moving mechanism to the exit; wherein the elevating mechanism comprising:
  - at least one guiding track extending in a height direction of the chamber;
  - a second driving rod mounted through a side wall of the chamber and adjacent to the exit, one end of the second driving rod located in the chamber and another end of the second driving rod located out of the chamber;
  - a second driving element securely mounted on the end of the second driving rod that is located in the chamber;
  - a second driving belt arranged in a loop and sleeved on the second driving element; and
  - an elevating board connected to the second driving belt and capable of moving along the at least one guiding track.

12. The cooking device as claimed in claim 11, wherein the elevating mechanism further comprises:
- a joint gear securely mounted on the end of the second driving rod that is located out of the chamber, the joint gear of the elevating mechanism being detachably connected to the power source of the food vending machine.

13. The cooking device as claimed in claim 11 further comprising:
- a sensor for detecting a location of the ingredients and comprising:
  - a tilting component, one end of the tilting component tiltably mounted adjacent to the exit, and the tilting component capable of tilting along the lengthwise direction of the chamber when abutted by the ingredients;
- wherein the elevating board comprises:
  - a cavity, the tilting component accommodated in the cavity, wherein when the tilting component is abutted by the ingredients and thus tilts, the exit cover is opened and the elevating board elevates the ingredients.

14. A cooking device equipped in a food vending machine for cooking ingredients provided by the food vending machine, the cooking device comprising:
- a chamber extending in a straight line and having:
  - an entrance and an exit located on two ends of the chamber;
  - a preparing space located between the entrance and the exit and communicating with the entrance and the exit;
  - an entrance cover selectively closing the entrance; and
  - an exit cover selectively closing the exit;
- a heating component mounted in the preparing space of the chamber and extending in a lengthwise direction of the chamber;
- a moving mechanism mounted in the preparing space of the chamber and extending in the lengthwise direction of the chamber, the moving mechanism capable of transiting the ingredients from the entrance to the exit of the chamber; and
- a sensor for detecting a location of the ingredients, the sensor mounted in the preparing space and adjacent to the exit and activating the exit cover to open; wherein the sensor comprises:
  - a tilting component; one end of the tilting component tiltably mounted adjacent to the exit, and the tilting component capable of tilting along the lengthwise direction of the chamber when abutted by the ingredients; the tilting component comprising:
    - a block located at another end of the tilting component opposite the exit.

15. A cooking device equipped in a food vending machine for cooking ingredients provided by the food vending machine, the cooking device comprising:
- a chamber extending in a straight line and having:
  - an entrance and an exit located on two ends of the chamber;
  - a preparing space located between the entrance and the exit and communicating with the entrance and the exit;
  - an entrance cover selectively closing the entrance; and
  - an exit cover selectively closing the exit;
- a heating component mounted in the preparing space of the chamber and extending in a lengthwise direction of the chamber; and
- a moving mechanism mounted in the preparing space of the chamber and extending in the lengthwise direction of the chamber, the moving mechanism capable of transiting the ingredients from the entrance to the exit of the chamber;
- wherein the exit cover is pivotably mounted on the chamber and comprises:
  - a joint gear, the joint gear of the entrance cover detachably connected to a power source of the food vending machine.

* * * * *